(12) United States Patent
Yamanashi

(10) Patent No.: US 6,459,167 B1
(45) Date of Patent: Oct. 1, 2002

(54) SYSTEM FOR CONTROLLING ELECTROMOTIVE FORCE OF MOTOR OF ELECTRIC VEHICLE

(75) Inventor: Hidenori Yamanashi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/514,325

(22) Filed: Feb. 28, 2000

(30) Foreign Application Priority Data

Feb. 26, 1999 (JP) ............................................ 11-052036

(51) Int. Cl.[7] ................................................. H02H 9/02
(52) U.S. Cl. ...................................... 307/9.1; 307/10.1
(58) Field of Search ................................. 307/9.1, 10.1

(56) References Cited

U.S. PATENT DOCUMENTS

| | | | | |
|---|---|---|---|---|
| 5,142,435 A | * | 8/1992 | Baumgartner et al. | ......... 361/2 |
| 5,361,008 A | | 11/1994 | Saijo | |
| 5,369,540 A | * | 11/1994 | Konrad et al. | .................. 361/6 |
| 5,567,991 A | * | 10/1996 | Schantz et al. | ............ 307/10.1 |
| 5,894,394 A | | 4/1999 | Baba et al. | |
| 5,994,789 A | * | 11/1999 | Ochiai | ........................ 307/10.1 |

FOREIGN PATENT DOCUMENTS

| | | | | |
|---|---|---|---|---|
| JP | 1-1227520 | 9/1989 | | .......... H03K/17/08 |
| JP | 2-266836 | 10/1990 | | ............. H02J/7/10 |
| JP | 3-262209 | 11/1991 | | .......... H03K/17/08 |
| JP | 4-134271 | 5/1992 | | ......... G01R/19/165 |
| JP | 5-52880 | 3/1993 | | ......... G01R/19/165 |
| JP | 6-27157 | 2/1994 | | ......... G01R/19/165 |
| JP | 6-61432 | 3/1994 | | ............ H01L/27/06 |
| JP | 6-188704 | 7/1994 | | .......... H03K/17/08 |
| JP | 6-244414 | 9/1994 | | ......... H01L/29/784 |
| JP | 6-244693 | 9/1994 | | .......... H03K/17/08 |
| JP | 9-145749 | 6/1997 | | ........... G01R/19/00 |
| JP | 9-331625 | 12/1997 | | ............. H02H/3/08 |
| JP | 10304501 A | * 11/1998 | | ............. B60L/3/00 |
| JP | 2000253570 | * 9/2000 | | ............. H02H/9/02 |

* cited by examiner

*Primary Examiner*—Fritz Fleming
(74) *Attorney, Agent, or Firm*—Sughrue Mion, PLLC

(57) ABSTRACT

In a system for controlling electromotive force of a motor of an electric vehicle, an intelligent-power switch unit (IPS1) is connected to a power supply line (10) between a battery (4) and a motor controller (7) in parallel with a main relay (6) instead of a precharge circuits having mechanical relays and charge resistors. The intelligent-power switch unit (IPS1) mainly has an electric-power-supply control unit including a MOSFET (QA) serving as a semiconductor switching device, and is integrated in one chip structure. Accordingly, the cost and size can be reduced, and damage of the motor controller (7) caused from a rush current occurring when electric power has been supplied can effectively be prevented.

4 Claims, 4 Drawing Sheets

SYSTEM FOR CONTROLLING ELECTROMOTIVE FORCE OF MOTOR OF ELECTRIC VEHICLE

BACKGROUND OF THE INVENTION

1. Field of the Invention

The present invention relates to a system for controlling electromotive force of a motor of an electric vehicle such that precharge is controlled when electric power is supplied to a motor of the electric vehicle.

The present application is based on Japanese Patent Application No. Hei. 11-52036, which is incorporated herein by reference.

2. Description of the Related Art

FIG. 3 is a schematic diagram showing a switching circuit for turning a driving motor of an electric vehicle on. Electric power is supplied to a driving motor 5 from a power source 4 through a power supply line, the power source 4 comprising a mounted battery, which is a load and which is arranged to produce output voltage VB of 400 V. The driving motor 5 is turned on by turning the mechanical main relay 6 on. Since a motor controller 7 for controlling the driving motor 5 contains a capacitor, a great current rapidly flows when the rotation of the driving motor 5 is started. Therefore, there arises a problem in that the fuse is blown or the electrode of the main relay 6 sustains damage.

To overcome the above-mentioned problem, a precharge circuit incorporating a precharge relay 8, which is also a mechanical relay, and a charge resistor 9 is, in parallel, connected to a positive electric line of the power source 4 for supplying electric power. That is, the precharge circuit is turned on in a first stage of start of the driving motor 5 to supply a small electric current controlled by the charge resistor 9 to the motor controller 7 for several seconds. Then, the precharge circuit is turned off, and the main relay 6 is switched on. Thus, the problem caused from rapid supply of a large current can be prevented.

As an alternative to the relay incorporating the mechanical contact, an intelligent-power switch unit (hereinafter abbreviated to "IPS") has been employed in recent years. The IPS is a switching circuit incorporating a semiconductor switching device exhibiting advantageous characteristic. Since the IPS has a self-protective function against abnormality, such as overcurrent, overheat, or the like, the IPS has been employed as a substitute for the mechanical precharge circuit configured as shown in FIG. 3. For example, such a unit has been disclosed in Unexamined Japanese Patent Publication No. Hei. 9-331625.

The disclosed unit incorporates an abnormal-signal output portion arranged to detect the level of the voltage output from a semiconductor switch device. The unit interrupts an excessively large electric current caused from short circuit or the like and issues an alarm of abnormality caused from a small current or overheat occurring owing to opening. Thus, the harness and the system units can effectively be protected.

The IPS supplies voltage to a semiconductor switch device, such as a MOSFET (Metal Oxide Semiconductor Field Effect Transistor), through an input terminal. The MOSFET is turned on/off in response to an ON/OFF signal output from a drive circuit (a driver). The IPS incorporates an overvoltage detecting circuit for detecting overvoltage when the power supply voltage has been brought to the overvoltage state. Moreover, the IPS incorporates a current detecting circuit for detecting overcurrent by making a comparison between the voltage level caused from the value of an electric current which flows between the drain and the source of the MOSFET and a reference voltage generated by a reference voltage generating circuit. In addition, the IPS incorporates a temperature detecting circuit for detecting overheat of the MOSFET. Detection signals output from the detection circuits are supplied to a NOR circuit or the like. An output signal from the NOR circuit is supplied to the device circuit and a booster circuit (a charge pump circuit). The charge pump circuit is required to raise the voltage level of the gate of the MOSFET when the MOSFET is employed on a high-side in the upstream portion of the load, such as an audio unit. The charge pump circuit is a circuit for raising the output voltage of the battery to output the voltage to the drive circuit as the drive voltage so as to drive the MOSFET. In general, the charge pump circuit is provided for each MOSFET.

However, there is a possibility that the driving-motor switching circuit for an electric vehicle shown in FIG. 3 encounters the following problems which should be solved.

Since both of the main relay 6 and the precharge relay 8 are mechanical relays, the cost and size of each relay cannot easily be reduced.

There arises another problem caused from control of the flow of a large electric current by using the charge resistor 9 having resistance value R which is, for example, 10 ohms ($\Omega$). Since the charge resistor 9 cannot be omitted from the circuit, the size of the precharge circuit cannot easily be reduced.

Another problem will now be described. As an alternative to the mechanical relay, a MOS (Meal Oxide Semiconductor) FET (Field Effect Transistor) comprising a semiconductor switch device may be employed. When a rush current flows when electric power is supplied to the driving motor 5 which is the load, there is apprehension that breakdown of the MOSFET occurs. Therefore, also the charge resistor 9 is required when the MOSFET is employed to serve as the switching device. Thus, the size of the precharge circuit cannot satisfactorily be reduced.

SUMMARY OF THE INVENTION

Taking excellent characteristics of the IPS into consideration, an object of the present invention is to provide a system for controlling electromotive force of a motor of an electric vehicle, in which, in a switching circuit making a driving motor of the electric vehicle start, an IPS utilizing a semiconductor switching device is employed as a substitute for a precharge circuit having mechanical relays and charge resistors, thereby effectively protecting units by limiting overcurrent occurring when the system is started and permitting cost and size reduction.

To achieve the above object, according to the first aspect of the present invention, there is provided a system for controlling electromotive force of a motor of an electric vehicle, which comprises a motor controller connected to a power supply through a power supply line, and connected to a driving motor which is a load of the power supply, wherein electric power is supplied to the driving motor from the power supply through the motor controller, the motor controller having a capacitor, a main relay inserted in the power supply line to be disposed between the power supply and the motor controller, and a precharge device connected to the power supply line so that the precharge device is connected to the main relay in parallel, the precharge device charging the capacitor of the motor controller in an initial stage of supply of the electric power, wherein the precharge device is turned off after charging the capacitor a predetermined capacity, and the main relay is turned on so that a power current is supplied to the driving motor, and wherein the precharge device has an intelligent-power switch unit mainly comprised of an electric-power-supply control unit including a main MOSFET serving as a semiconductor switching device.

In the above-described system, the precharge circuit including a mechanical precharge relay and a charge resistance is omitted, and the intelligent-power switch unit mainly comprised of the electric-power-supply control unit including the one-chip semiconductor switch device, such as the MOSFET etc., is connected as a substitute for the precharge circuit. Thus, the size and the cost of the system are effectively reduced. Moreover, damage of the motor controller caused due to a rush current which flows when electric power has been supplied can be prevented.

Further, according to the second aspect of the present invention, it is preferable that the electric-power-supply control unit includes the main MOSFET which is capable of limiting an electric current, a first reference circuit which is connected in parallel to the main MOSFET, generates a reference voltage for detecting overcurrent which flows in the power supply line, and outputs an abnormality detection signal generated owing to the overcurrent, a second reference circuit which is connected in parallel to the main MOSFET, generates a reference voltage for detecting undercurrent which flows in the power supply line, and issues an alarm to an outside by outputting an abnormality detection signal generated owing to the undercurrent as a monitor signal, a charge pump circuit which raises an output voltage from the power supply in a state that a switch corresponding to the load is switched on, and outputs a voltage raised as a drive voltage, and a drive circuit which makes the main MOSFET turn off by supplying the drive voltage supplied from the charge pump circuit to the main MOSFET when the drive circuit receives a low-level signal from the first reference circuit in response to the abnormality detection signal indicating the overcurrent. When abnormal overcurrent caused from, for example, short circuit, has been detected, the main MOSFET is turned off. When abnormal undercurrent caused from, for example, opening, has been detected, the monitor signal is output to issue an alarm to the outside. Thus, the power supply line and the foregoing system units can be protected. The operations, which must be performed in the event of the abnormality, are performed with satisfactory response to correspond to the overcurrent, the undercurrent or the overheat.

Further, according to the third aspect of the present invention, it is preferable that the first reference circuit includes a first comparator which inverts a high level signal generated in response to the abnormality detection signal indicating the overcurrent into the low level signal, and outputs the low level signal to the drive circuit, and a second comparator which inverts a low level signal generated in response to the abnormality detection signal indicating the undercurrent into a high level signal, and outputs the monitor signal. Since the first and second comparators are respectively provided for detecting the overcurrent and the undercurrent, the response for the detection of each abnormality can be effectively improved, and therefore, the reliability can be improved.

Incidentally, according to the second aspect of the present invention, the electric-power-supply control unit is capable of limiting overcurrent. The current limiting function of the electric-power-supply control unit is apparent from a region (A) shown in FIG. 4 (described later).

The above and other objects, features and advantages of the present invention will become more apparent from the following detailed description of the preferred embodiments when read in conjunction with the accompanying drawings.

DETAILED DESCRIPTION OF THE PREFERRED EMBODIMENTS

An embodiment of a system for controlling electromotive force of a motor of an electric vehicle according to the present invention will now be described with reference to the drawings.

Figure 1:
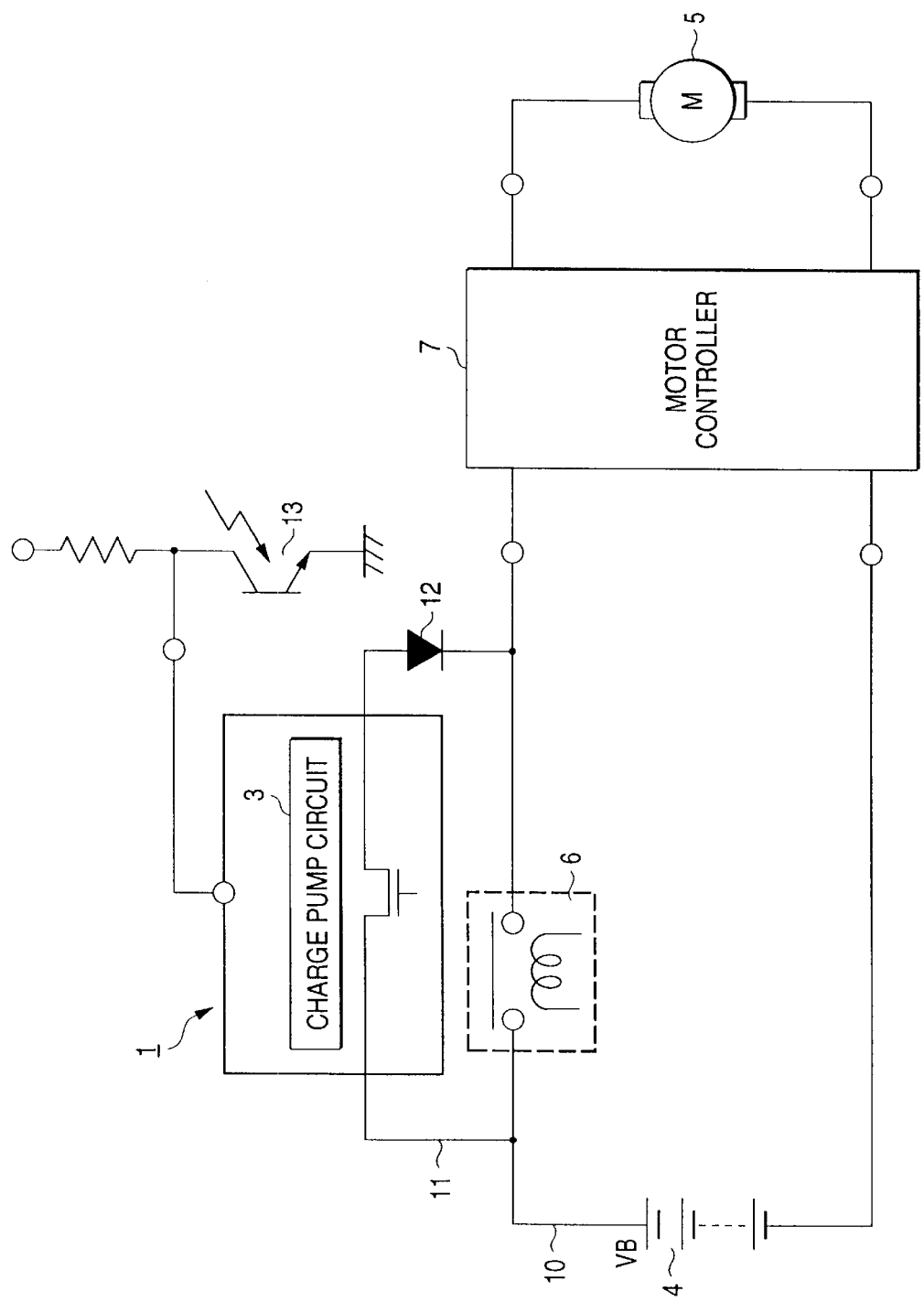
FIG. 1 is a circuit diagram showing an embodiment of a system for controlling electromotive force of a motor of an electric vehicle according to the present invention.
Figure 2:
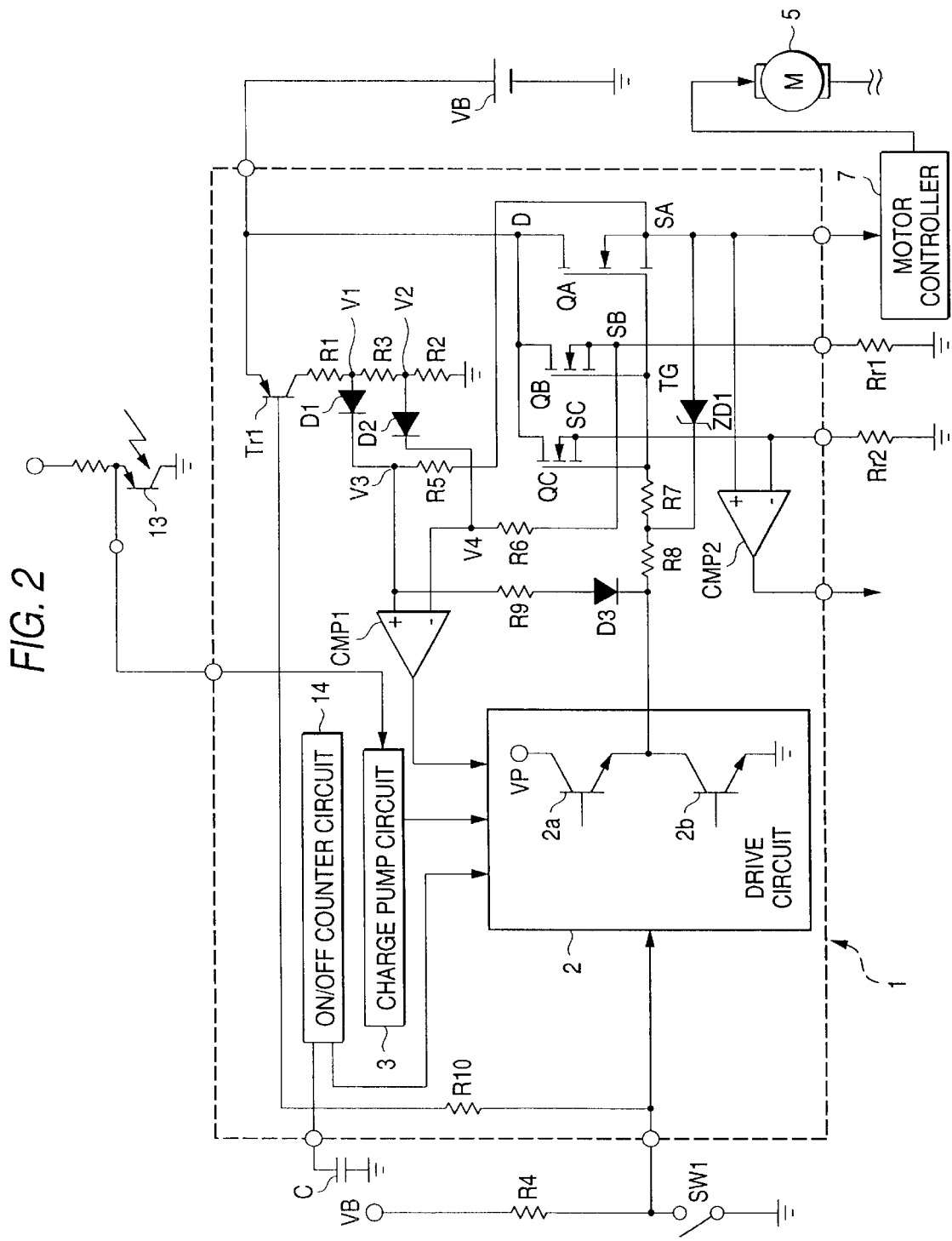
FIG. 2 is a circuit diagram showing the configuration of an IPS provided to serve as a precharge circuit of the system for controlling electromotive force.
Figure 3:
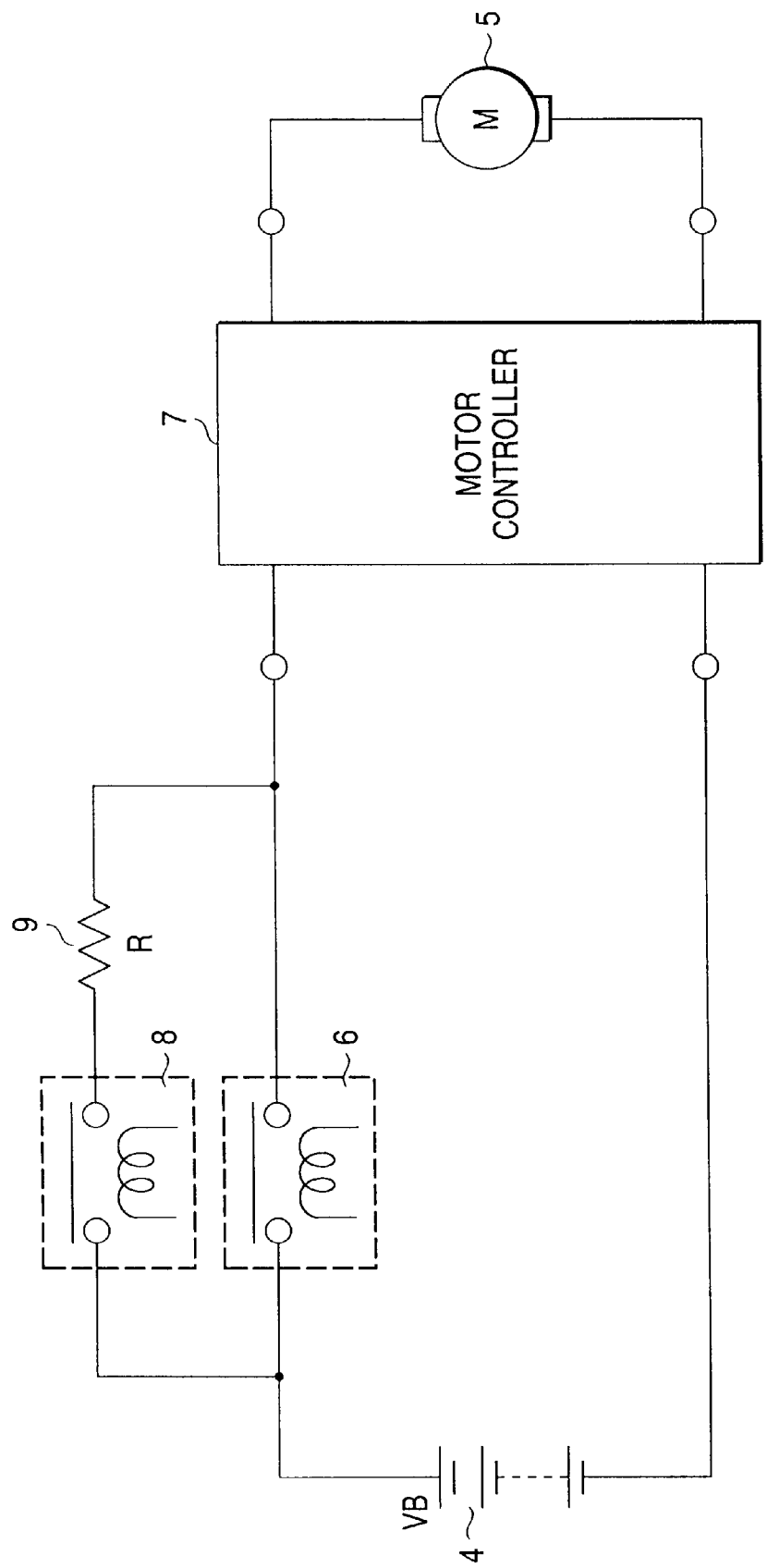
FIG. 3 is a block diagram showing a related precharge circuit comprising mechanical relays.

FIG. 1 is a circuit diagram showing an IPS which is a main element of the system for controlling electromotive force according to this embodiment. FIG. 2 is a circuit diagram showing the configuration of the IPS. Elements common to those of the related circuit shown in FIG. 3 are given the same reference numerals.

A battery 4 mounted on an electric-power-supply control unit and arranged to produce output voltage VB supplies electric power to a driving motor 5 through a power supply line 10, the driving motor 5 being a load. In the foregoing case, the related main relay 6 is connected to the power supply line 10 between the battery 4 and a motor controller 7. As a precharge circuit for assisting the main relay 6, an IPS 1, which is a load, is, in parallel, connected to a high side in the upstream portion of the driving motor 5 in a bypass manner, the IPS 1 being connected in parallel. A backflow preventive diode 12 is connected to the output terminal of a parallel line 11. The backflow preventive diode 12 prevents short circuit caused from a parasitic diode, such as a main MOSFET QA in the IPS 1 to be described below, when inverse voltage has been generated in the main relay 6.

As shown in FIG. 2, the IPS 1 is formed by integrating a power-supply control unit mainly having a semiconductor switch device etc. in one chip. The IPS 1 controls the electric current which is supplied from the battery 4 arranged to produce the output voltage VB to the driving motor 5. As described later, the IPS 1 has an excellent protective function against abnormality occurring due of overcurrent caused from short circuit, undercurrent caused from opening and overheat.

A main MOSFET QA is connected to the power supply line 10 of the battery 4. The main FET QA is an n-channel MOSFET having a DMOS structure. In this embodiment, the main MOSFET QA is a MOSFET with a built-in temperature sensor, and has an overheat circuit-breaking function with which the operation is forcibly interrupted when its temperature has been raised to a level not lower than a predetermined level. As the main MOSFET QA, a p-channel MOSFET having a DMOS structure or a power MOSFET may be employed.

A first reference circuit for detecting overcurrent which flows in the power supply line 5 is disposed in parallel with the main MOSFET QA. A second reference circuit is disposed which generates reference voltage for detecting undercurrent which flows in the power supply line 5. The first reference circuit includes a first reference FET QB and resistor Rr1, while the second reference circuit includes second reference FET QC and resistor Rr2. The drains of the FET QB and QC are connected to drain D of the main MOSFET QA. The gates of the first and second reference FET QB and QC are connected to the gate of the main MOSFET QA. Sources SB and SC of the first and second reference FET QB and QC are grounded through the resistors Rr1 and Rr2.

Specifically, the IPS 1 is able to detect overcurrent I1 which flows in the power supply line 5 and a load 6 in the first reference circuit. Moreover, the IPS 1 is able to detect electric current I2 which is somewhat larger than steady-state current I0 which flow when the load 6 is operated normally. Therefore, the ratio of magnitudes of the currents satisfies the following relationship:

$$I0<I2<I1.$$

Each of FET QA, QB and QC has a plurality of transistors. The ratio of the number of the transistors satisfies QA>QB and QA>QC. For example, the ratio of the transistors of FET QA and QB and that of FET QA and QC may be 1000:1. The levels of the resistors Rr1 and Rr2 will now be described. When a load current of, for example, 5 amperes (A) flows in the main MOSFET QA, the set levels of the resistors Rr1 and Rr2 cause voltage Vds between the drain and source similar to the main MOSFET QA to be generated in the first reference FET QB.

Therefore, when a drain current of 5 A flows in the main MOSFET, a drain current of 5 mA flows in each of the first and second reference FET QB and QC. Thus, the voltage levels between the drain and source of the FET QA, QB, and QC coincide with one another. Moreover, also the voltage levels between the gate and the source of the FET QA, QB and QC coincide with one another.

Source SA of the main MOSFET QA is connected to the positive terminal of a first comparator CMP1 through a resistor R5, while source SB of the first reference FET QB is connected to the negative terminal of the first comparator CMP1 through a resistor R6. The first comparator CMP1 is provided to determine whether or not the electric current which flows in the power supply line 5 is overcurrent. The first comparator CMP1 makes a comparison between the voltage (the potential in the source SA) between the drain and the source of the main MOSFET QA and the voltage (the potential of the source SB) between the drain and the source of the first reference FET QB. In a period in which the difference is not lower than a criteria for determination of overcurrent (in a period in which the potential of SA is not lower than that of SB), the first comparator CMP1 outputs a Hi level signal. When the difference has been made to be larger than the criterion for determination of the overcurrent (when the potential of SA is lower than that of SB), the first comparator CMP1 outputs a Lo (low) level signal.

An output signal from the first comparator CMP1 is supplied to the drive circuit 2 which turns the main MOSFET QA on or off. The drive circuit 2 is supplied with output voltage VB from the battery 4 through the resistor R4 when switches SW1, . . . , the number of which corresponds to the load 6, have selectively be switched on. Moreover, voltage VP (for example, VP=VB+5 V) raised by the charge pump circuit 3 is supplied to the first comparator CMP1 as the drive voltage. The drive circuit 2 is operated such that when, for example, the switch SW1 has been switched on to supply a Hi (high) level signal from the first comparator CMP1, a source-side transistor 2a is turned off. On the other hand, a sink-side transistor 2b is turned off. Then, the drive circuit 2 outputs a drive signal, which is the voltage VP, to the gate of the main MOSFET QA through the resistors R8 and R7. Thus, the main MOSFET QA is turned on. In a period in which the Hi level signal is supplied, the drive circuit 2 continuously outputs the drive signal which is the voltage VP. When the first comparator CMP1 has been inverted and a L signal has been supplied, the drive circuit 2 is operated such that the source-side transistor 2a is turned off and the sink-side transistor 2b is turned on. Thus, the main MOSFET QA is turned off.

The source SA of the main MOSFET QA is connected to the positive terminal of the second comparator CMP2, while the source SB of the first reference FET QB is connected to the negative terminal of the second comparator CMP2. The second comparator CMP2 determines whether or not the electric current which flows in the power supply line 5 is undercurrent. The second comparator CMP2 makes a comparison between the voltage (the potential of the source SA) between the drain and source of the main MOSFET QA and the voltage (the potential of the source SB) between the drain and the source of the first reference FET QB. When the potential of the source SA is lower than the potential of the source SB by a level not lower than a predetermined level, the second comparator CMP2 outputs, for example, a Hi level signal which is a criterion for determining the undercurrent. The Hi level signal is, as a monitor signal, output to turn an alarm lamp on or blink the same to issue an alarm.

Resistors R5 and R9 and a diode D3 are, in series, connected between the source SA of the main MOSFET QA and the output terminal of the drive circuit 2, that is, a collector terminal of the sink-side transistor 2b. Thus, hysteresis is imparted to the operation for the first comparator CMP1 to be inverted from the state for outputting the Lo level signal to the state for outputting the Hi level signal. As a result, after the main MOSFET QA has been turned off, the electric current flows from the source SA of the main MOSFET QA to pass through the resistors R5, R9, the diode D3 and the sink-side transistor 2b to the ground. The potential of the source SA is lowered by a level corresponding to the voltage drop in the transistor R5.

A return circuit is connected to the first comparator CMP1. The return circuit returns the main MOSFET QA to the ON state after the main MOSFET QA in the ON state has been turned off owing to abnormality, such as occurrence of overcurrent, caused from short circuit. The return circuit incorporates a transistor Tr1 having an emitter connected to the output terminal adjacent to the battery 4 and a base connected to the input terminal adjacent to the switch SW1 through resistor R0. Moreover, the return circuit incorporates resistors R1, R3 and R2, in series, connected in between the collector of the transistor Tr1 and the ground. In addition, the return circuit incorporate a diode D1 for passing an electric current which flows in the resistor R1 to the positive terminal of the first comparator CMP1; and a diode D2 for passing an electric current which flows in the resistors R1 and R3 to the negative terminal of the first comparator CMP1. The resistance level of the resistor R1 is set to be a level which causes the potential V1 at the connected point between the resistors R1 and R3 to be 60% to 80% which is higher than voltage V3 (the potential of the diode D1 adjacent to the cathode). The voltage V3 is lowered from the potential of the source SA by a level corresponding to the voltage drop at the resistor R5 after the switch SW1 has been switched on to turn the transistor Tr1 on.

The ON/OFF count circuit 14 causes the capacitor C to be charged when the gate is turned off during the ON/OFF operation of the main MOSFET QA according to this embodiment. The capacitor C is charged only when VDS is raised to the Hi level by an AND method during a period in which the gate is turned off. The capacitor C is not charged when the gate is continuously be turned on or off.

As shown in FIGS. 1 and 2, the main MOSFET QA and the like in the IPS1 are connected to the high side in the upstream portion of the driving motor 5 which is the load. Therefore, the charge pump circuit 3 for raising the output voltage VB from the battery 4 to the voltage VP is required as described above. The charge pump circuit 3 is turned on/off by a phototransistor 13 for communicating an ON/OFF signal from a microcomputer (not shown).

The operation and effects of the system for controlling electromotive force incorporating the IPS 1 having the above-mentioned configuration will now be described with reference to FIG. 1.

The IPS 1 integrated in a single semiconductor chip has the function of the precharge circuit similar to the related circuit shown in FIG. 3. Therefore, the charge resistor 9 is not required to limit a rush current which occurs when the operation has been started owing to supply of electric power. Assuming that the highest level of the limiting current for the IPS 1 is set to be 10 A, the precharge circuit of the IPS 1 is able to satisfactorily perform change in some hundreds of milliseconds if the capacity of capacitor in the motor controller 7 is 6000 $\mu$F.

In a state where the main relay 6 is turned off, the capacitor in the motor controller 7 is not charged. The difference in the potential owing to output voltage VB from the battery 4 has been made between the electrodes of the main relay 6. If the main relay 6 is turned on in the foregoing case, the main relay 6 sustains damage or the like.

To prevent the foregoing problem, this embodiment has such configuration that the IPS 1 is operated to sufficiently charge the capacitor of the motor controller 7. Moreover, the main relay 6 is turned on in a state in which the difference in the potential has disappeared. That is, the precharge is performed such that the input signal is transmitted to the phototransistor 13 from the microcomputer to turn the charge pump circuit 3 on. The charge pump circuit 3 raises the output voltage VB of the battery 4 to the voltage VP to supply the voltage VP to the drive circuit 2. The drive circuit 2 outputs an ON signal to apply the drive voltage to the gate of the main MOSFET QA.

Since the drive voltage is applied to the gate, the charge current flows to the capacitor in the motor controller 7. The charge current which flows to the capacitor is interrupted when the charged current is made to be higher than a current value which has been determined owing to the limiting function provided for the IPS 1.

Figure 4:
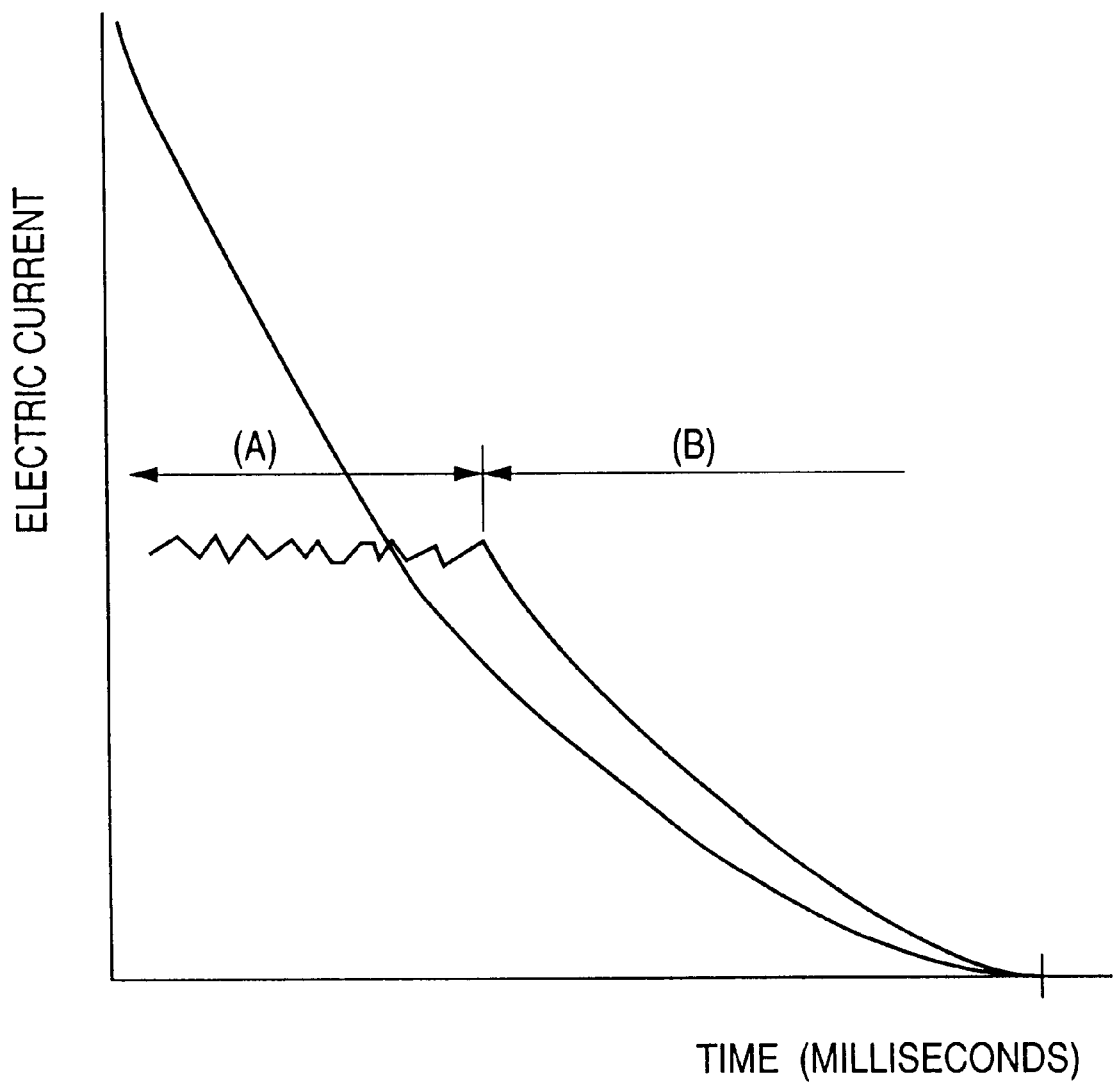
FIG. 4 is a graph showing switching characteristics between precharge and main relay charge with respect to lapse of time.

FIG. 4 is a graph showing the correlation between current values and time. FIG. 4 shows a limited region with symbol (A), the limited region being employed when the capacity of the capacitor of the motor controller 7 has been made to be larger than a limited current value. When the quantity of charge to the capacitor has been enlarged and the quantity of the electric current has been reduced, the current limiting function of the IPS 1 is automatically canceled and turned off. The foregoing state corresponds to a region indicated with symbol (B). The precharge function Hi of the IPS 1 is turned off in the region (B) and the main MOSFET QA is turned off so that the main relay 6 is switched on.

As described above, the system for controlling electromotive force of a motor of an electric vehicle according to the present invention can omit the related precharge circuits having the mechanical precharge relays and the charge resistors. As an alternative to this, an IPS (Intelligent-Power Switch unit) formed by integrating the semiconductor switch device in one chip is connected. Thus, cost and size can be reduced. Moreover, damage of the motor controller caused from a rush current occurring when electric power has been supplied can effectively be prevented.

What is claimed is:

1. A system for controlling electromotive force of a motor of an electric vehicle, the system comprising:

a motor controller connected to a power supply through a power supply line, and connected to a driving motor which is a load of the power supply, wherein electric power is supplied to the driving motor from the power supply through the motor controller, the motor controller having a capacitor;

a main relay inserted in the power supply line disposed between the power supply and the motor controller; and a precharge device connected to the power supply line and connected to the main relay in parallel, the precharge device being operable to charge the capacitor of the motor controller in an initial stage of supply of the electric power, wherein the precharge device is de-energized after charging the capacitor to a predetermined capacity, and the main relay is energized so that a power current is supplied to the driving motor, and wherein further the precharge device has an intelligent-power switch unit comprised of an electric-power-supply control unit including a main MOSFET semiconductor switching device capable of limiting an electric current flowing through the precharge device to an arbitrary value.

2. The system of claim 1, wherein the electric-power-supply control unit comprises:

a first reference circuit connected in parallel to the main MOSFET, operable to generate a reference voltage for detecting overcurrent flowing in the power supply line, and output an abnormality detection signal in accordance with the overcurrent;

a second reference circuit connected in parallel to the main MOSFET, operable to generate a reference voltage for detecting undercurrent flowing in the power supply line, and issue an external alarm by outputting an abnormality detection signal in accordance with the undercurrent as a monitor signal;

a charge pump circuit operable to raise an output voltage from the power supply when a switch corresponding to the load is on, and output a drive voltage, and a drive circuit operable to turn the main MOSFET off by supplying the drive voltage supplied from the charge pump circuit to the main MOSFET when the drive circuit receives a low-level signal from the first reference circuit in response to the abnormality detection signal indicating the overcurrent.

3. The system of claim 2, wherein the first reference circuit includes:

a first comparator which inverts a high level signal generated in response to the abnormality detection signal indicating the overcurrent into the low level signal, and outputs the low level signal to the drive circuit, and a second comparator which inverts a low level signal generated in response to the abnormality detection signal indicating the undercurrent into a high level signal, and outputs the monitor signal.

4. The system of claim 2, wherein the electric-power-supply control unit is capable of limiting overcurrent.

* * * * *